(12) United States Patent
Jajur et al.

(10) Patent No.: US 9,764,852 B2
(45) Date of Patent: Sep. 19, 2017

(54) METHODS AND SYSTEMS FOR INTEGRATING AUTO PILOT FUNCTIONS ON A DISPLAY

(71) Applicant: HONEYWELL INTERNATIONAL INC., Morristown, NJ (US)

(72) Inventors: Babitha Jajur, Karnataka (IN); Mohan Gowda Chandrashekarappa, Karnataka (IN); Kiran Mancheiah Venkataramana, Karnataka (IN); Deepthi Sethuraman, Karnataka (IN); Sridevi Nagaraja, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 18 days.

(21) Appl. No.: 14/657,870

(22) Filed: Mar. 13, 2015

(65) Prior Publication Data

US 2016/0264254 A1    Sep. 15, 2016

(51) Int. Cl.
*B64D 43/00* (2006.01)
*G06F 3/0484* (2013.01)
*G06F 3/0488* (2013.01)
*G01C 23/00* (2006.01)

(52) U.S. Cl.
CPC ............. *B64D 43/00* (2013.01); *G01C 23/00* (2013.01); *G06F 3/0488* (2013.01); *G06F 3/04847* (2013.01)

(58) Field of Classification Search
CPC ...................................................... G01C 23/00
See application file for complete search history.

(56) References Cited

U.S. PATENT DOCUMENTS

| | | | |
|---|---|---|---|
| 3,807,666 A * | 4/1974 | Devlin | G05D 1/0808 244/179 |
| 8,504,223 B2 | 8/2013 | Boorman et al. | |
| 2006/0238511 A1* | 10/2006 | Gyde | G01C 23/00 345/168 |
| 2011/0130897 A1* | 6/2011 | Gladysz, Jr. | G01C 23/00 701/15 |
| 2014/0074325 A1 | 3/2014 | Nikolic et al. | |

OTHER PUBLICATIONS

Knox, C., "Description of the Primary Flight Display and Flight Guidance System Logic in the NASA B-737 Transport Systems Research Vehicle," NASA Technical Memorandum, 1990.
(Author unknown) "Automated Flight Control," FAA, 2009.

* cited by examiner

*Primary Examiner* — Jelani Smith
(74) *Attorney, Agent, or Firm* — Lorenz & Kopf, LLP

(57) ABSTRACT

Methods and systems are provided for displaying information on a display device of an aircraft. The method comprises receiving aircraft data from one or more aircraft components; displaying on a user interface the aircraft data and at least one interactive display element associated with an autopilot control function; receiving user input based on an interaction with the at least one interactive display element; and selectively changing an appearance of the at least one interactive display element based on the user input.

15 Claims, 3 Drawing Sheets

METHODS AND SYSTEMS FOR INTEGRATING AUTO PILOT FUNCTIONS ON A DISPLAY

TECHNICAL FIELD

The present disclosure generally relates to methods and systems for presenting auto pilot function control options on a display, and more particularly relates to methods and systems of presenting auto pilot function options on lateral/vertical situation indicator display of an aircraft.

BACKGROUND

A Primary Flight Display (PFD) with an integrated Horizontal Situation Indicator (HSI) or Vertical Situation Indicator (VSI) is a modern aircraft instrument dedicated to flight information. The PFD is designed to improve a pilot's situational awareness by integrating information from various aircraft sensing and measuring equipment and the flight management computer into a single display, thereby reducing the amount of time the pilot would have otherwise spent to monitor multiple instruments. The modern day PFD integrates all flight critical information including Attitude, Lateral navigation/Compass, Flight Control, Primary Air Data (Altitude/Heading/Airspeed/Vertical Speed etc.), Traffic (Traffic Alert Collision Avoidance System—TCAS), Weather, Terrain (Enhanced Ground Proximity and Warning System—EGPWS) and Synthetic and Combined vision systems (SVS/CVS). PFDs also increase situational awareness by alerting the aircrew to unusual or potentially hazardous conditions like low airspeed, high rate of descent etc.

A Mode Control Panel (MCP) or Guidance Panel (GP) is the primary interface for a pilot to control autopilot functions. The MCP is usually located in the center of the glare shield for access by both pilots. The MCP includes various knobs and switches for selecting and configuring autopilot functions. When interacting with the MCP, the pilot's attention is directed away from the PFD and other important information.

Hence, there is a need for systems and methods for interactively displaying and receiving input for autopilot functions. Other desirable features and characteristics will become apparent from the subsequent detailed description and the appended claims, taken in conjunction with the accompanying drawings and the foregoing technical field and background.

BRIEF SUMMARY

Methods and systems are provided for displaying information on a display device of an aircraft. In one embodiment, a method comprises receiving aircraft data from one or more aircraft components; displaying on a user interface the aircraft data and at least one interactive display element associated with an autopilot control function; receiving user input based on an interaction with the at least one interactive display element; and selectively changing an appearance of the at least one interactive display element based on the user input.

In another embodiment, a system comprises a display device and a computer module. The computer module receives aircraft data from one or more aircraft components, displays on the display device a user interface, the user interface comprising the aircraft data and at least one interactive display element associated with an autopilot control function, receives user input based on an interaction with the at least one interactive display element, and selectively changes an appearance of the at least one interactive display element based on the user input.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
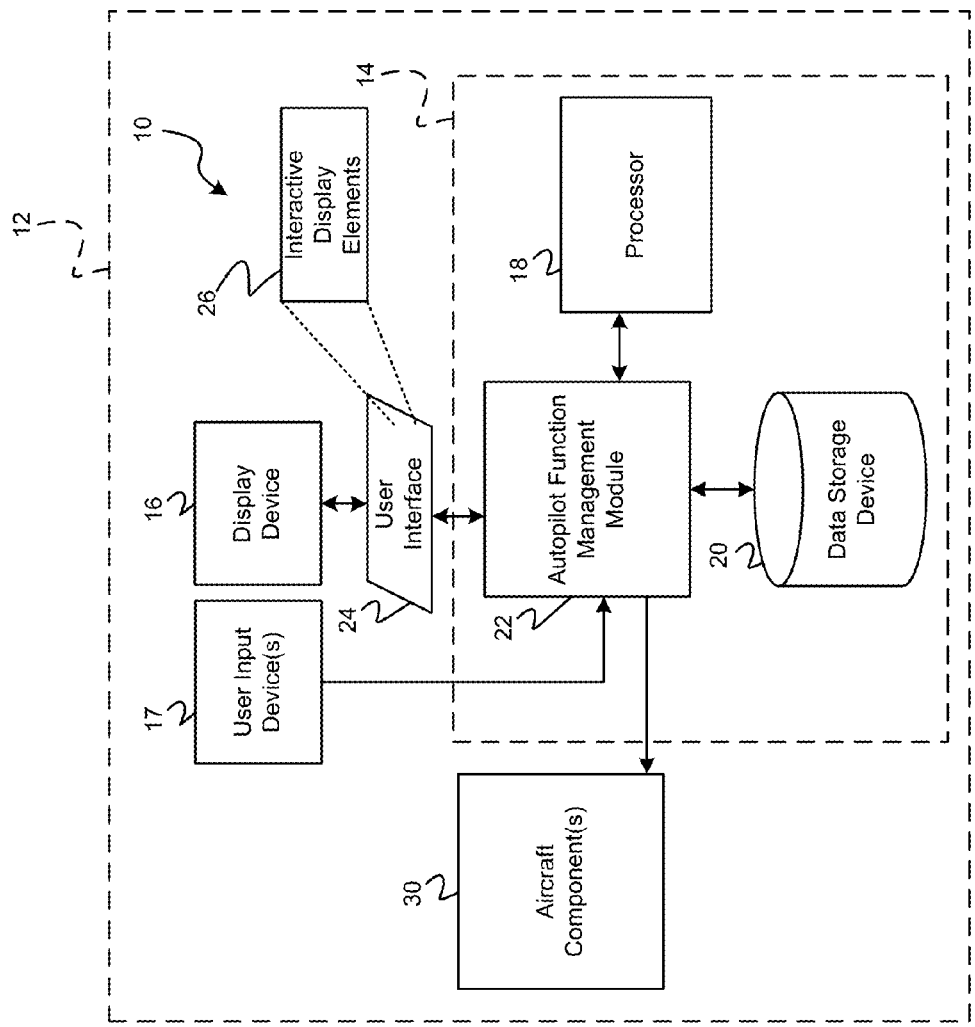
FIG. 1 is a functional block diagram illustrating autopilot function management system for an aircraft in accordance with exemplary embodiments.

Referring now to FIG. 1, exemplary embodiments of the present disclosure are directed to an autopilot function management system shown generally at 10 that is implemented on a computing device 14 that is associated with an aircraft 12. As can be appreciated, the autopilot function management system 10 described herein can be implemented in any aircraft 12 having onboard a computing device 14 and is not limited to any one example.

The computing device 14 is associated with a display device 16 and one or more user input devices 17. The display device 16 may be located in a cockpit of the aircraft 12 for viewing by, for example, a pilot of the aircraft 12. In various embodiments, the display device 16 is an interactive display device (e.g., a touch screen, or other interactive display device) that accepts user input from a user through the one or more user input devices 17.

The computing device 14 includes at least a processor 18, and one or more data storage devices 20. The processor 18 can be any custom made or commercially available processor, a central processing unit (CPU), an auxiliary processor among several processors associated with the computing device 14, a semiconductor based microprocessor (in the form of a microchip or chip set), a macroprocessor, or generally any device for executing instructions. The data storage device 20 stores instructions that can be performed by the processor 18. The instructions stored in the data storage device 20 may include one or more separate programs, each of which comprises an ordered listing of executable instructions for implementing logical functions.

The autopilot function management system 10 includes an autopilot function management module 22. The autopilot function management module 22 includes one or more instructions that may be stored in the data storage device 20 and executed by the processor 18 of the computing device 14.

In general, the instructions of the autopilot function management module 22 manage an interactive user interface 24 having integrated one or more interactive display elements 26 associated with one or more auto pilot feature control functions. For example, the autopilot function management module 22 manages the display of the one or more interactive display elements 26 representing the autopilot control functions on the display device 16. A pilot or other aircraft operator may interact with the user interface 24 using the one or more input devices 17 to select and control autopilot feature functions. The autopilot function management module 22 then manages user input received based on the operator's interaction with the interactive display elements 26 via the one or more user input devices 17. The management of the user input, in some instances, causes one or more autopilot functions to be performed by the aircraft 12. For example, the autopilot function management module 22 generates control messages and/or signals to aircraft components 30 to control one or more of the autopilot control functions.

Figure 2:
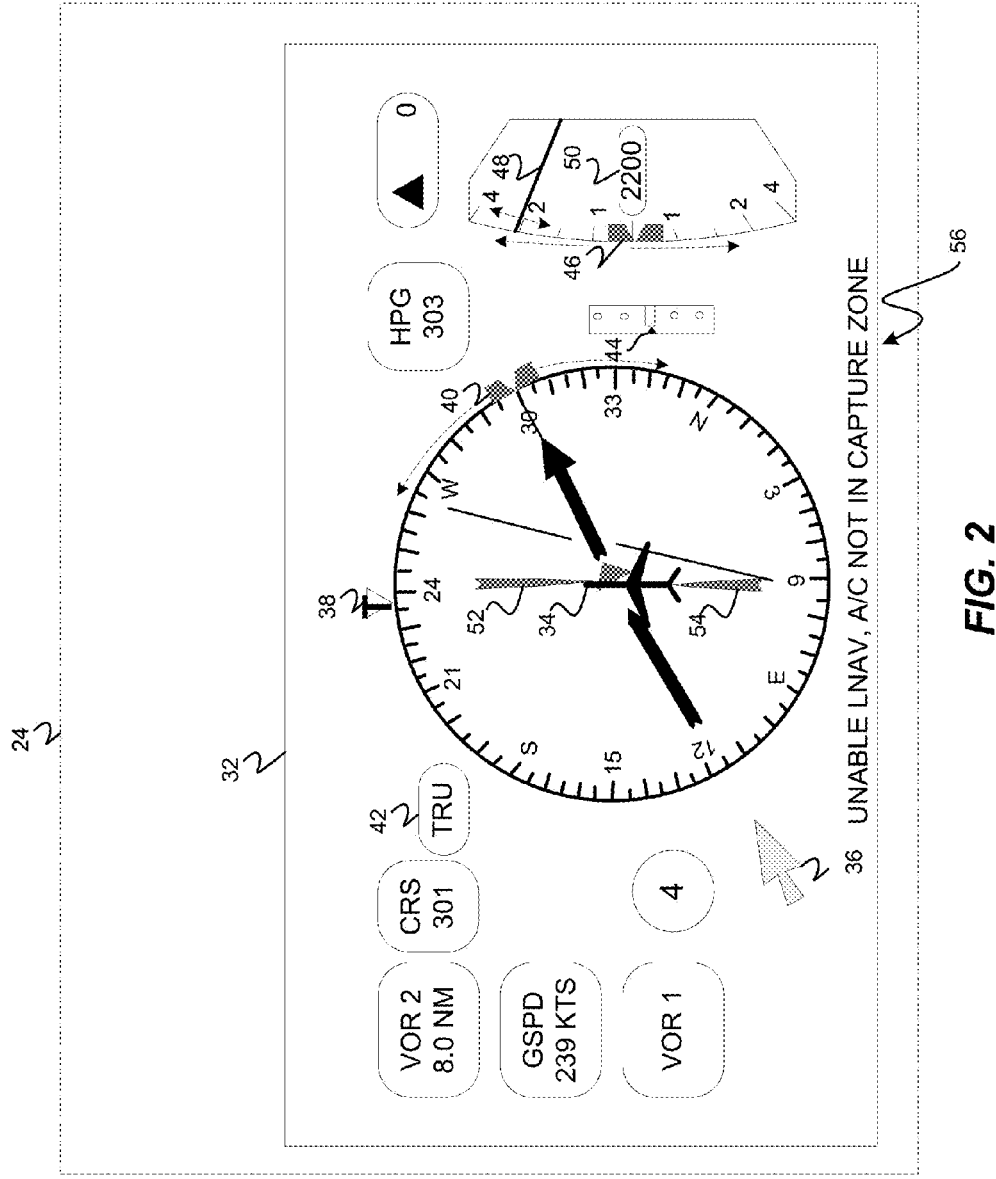
FIG. 2 is an illustration of a user interface that may be generated by an autopilot function management system and displayed on a display device of the aircraft in accordance with exemplary embodiments.

In various embodiments, as shown in FIG. 2 the user interface 24 includes a horizontal situation indicator (HSI) and Vertical Situation Indicator (VSI) or window 32 having conventional HSI and/or VSI display elements including, but not limited to, a compass display element, an altitude or VSI display element, and one or more data display boxes. As can be appreciated, the user interface 24 can include only the window 32 or can be included as a part of a Primary Flight Display (PFD), Near to Eye (NTE), or Heads Up Display (HUD), or other display that presents information about primary flight instruments, navigation instruments, status of the flight, and/or other information. In various embodiments, the interactive display elements 26 (FIG. 1) are incorporated into the window 32 such that a pilot or other operator's attention can be directed to the information presented on the window 32 even when selecting and enabling autopilot control features.

FIG. 2 illustrates exemplary interactive display elements 26 (FIG. 1) incorporated into the window 32. As can be appreciated, implementation of the interactive display elements 26 (FIG. 1) in various embodiments can be according to any size, color, intensity, shape, symbol, or form and are not limited to the present examples. As can further be appreciated, the interactive display elements 26 and their association with the various autopilot control functions are exemplary as other interactive display elements 26 and autopilot control functions can be implemented in various embodiments.

With particular reference to FIG. 2, in one example, an aircraft symbol 34 displayed on the compass display element of the window 32 is a virtual switch that is selectable to engage or disengage a Lateral Navigation (LNAV) mode. The LNAV mode, when selected, controls the lateral path of the aircraft 12. For Example, when in the LNAV mode, a guidance component uses data from performance and navigation components to compute the necessary maneuvers (thrust and roll) to maintain a lateral path.

With a cursor 36 (or other selection feature) near the aircraft symbol 34 on the window 32, the autopilot function management module 22 highlights the aircraft symbol 34 to indicate that the interactive display element is a virtual switch. When the aircraft symbol 34 is selected by a user interacting with a user input device 17, the autopilot function management module 22 changes the appearance of the aircraft symbol 34 to indicate that the mode associated with the aircraft symbol 34 (the LNAV mode) has been selected. For example, the color, intensity, size, shape, symbol, background, or other form of the aircraft symbol 34 changes.

In another example, a current heading marker 38 displayed on the window 32 functions as a virtual switch that is selectable to engage and disengage a Heading Hold Lateral (HHL) mode. The (HHL) mode, when selected, controls the heading of the aircraft 12. For Example, when in the (HHL) mode, a guidance component uses data from performance and navigation components to compute the necessary maneuvers to maintain a selected heading.

With the cursor 36 (or other selection feature) near the current heading marker 38 on the window 32, the autopilot function management module 22 highlights the current heading marker 38 to indicate that the display element is a virtual switch. When the current heading marker 38 is selected by a user interacting with a user input device 17, the autopilot function management module 22 changes the appearance of the current heading marker 38 to indicate that the mode associated with the current heading marker 38 (the (HHL) mode) has been selected. For example, the color, intensity, size, shape, symbol, background, or other form of the current heading marker changes.

In another example, a heading marker 40 on the window 32 functions as a virtual knob that is manipulable to select or deselect a heading select mode and to dial a particular heading. In various embodiments, the heading marker 40 could alternatively or additionally be used to engage and disengage the LNAV mode.

With the cursor 36 (or other selection feature) near the heading marker 40 on the window 32, the autopilot function management module 22 highlights the heading marker 40 to indicate that the display element is a virtual knob. When the heading marker 40 is selected by a user interacting with a user input device 17 and moved along the compass circle (e.g., in a direction shown by the arrows), the autopilot function management module 22 changes the appearance of the current heading marker 40 to indicate that the mode associated with the current heading marker has been selected and that a particular heading along the scale has been selected. For example, the color, intensity, size, shape, symbol, background, or other form of the heading marker 40 changes.

In another example, a course reference window 42 on the window 32 functions as a virtual switch that is selectable to select and deselect true or magnetic course references. The reference courses used for navigation can either be true north referenced (TRU) or earth's magnetic north referenced (MAG).

With the cursor 36 near the course reference window 42 on the window 32, the autopilot function management module 22 highlights the course reference window 42 to indicate that the display element is a virtual switch. When the course reference window 42 is selected by a user interacting with a user input device 17, the autopilot function management module 22 changes the appearance of the course reference window 42 to indicate that one of the TRU reference and the MAG reference mode associated with the current course reference window 42 has been selected. For example, the course reference window can display "TRU" or "MAG."

In another example, a vertical deviation marker 44 on the window 32 functions as a virtual switch that is selectable to engage and disengage a vertical navigation (VNAV) autopilot mode. The VNAV autopilot mode, when selected, controls the vertical speed of the aircraft 12. For Example, when in the VNAV mode, a guidance component uses data from performance and navigation components to compute the necessary maneuvers to maintain a vertical speed or altitude.

With the cursor 36 (or other selection feature) near the vertical deviation marker 44 on the window 32, the autopilot function management module 22 highlights the vertical deviation marker 44 to indicate that the display element is a virtual switch. When the vertical deviation marker 44 is selected by a user interacting with a user input device 17, the autopilot function management module 22 changes the appearance of the vertical deviation marker 44 to indicate that the mode associated with the vertical deviation marker 44 has been selected. For example, the color, intensity, size, shape, symbol, background, or other form of the vertical deviation marker 44 changes.

In another example, a flight path angle marker 46 on the window 32 functions as a virtual knob that is manipulable to select a Flight Plan Angle (FPA) mode and to dial a particular climb or descent altitude. The FPA mode, when selected, controls the vertical altitude of the aircraft 12. For Example, when in the FPA mode, a guidance component uses data from performance and navigation components to compute the necessary maneuvers to attain and maintain a specified constant (FPA).

With the cursor 36 near the flight path angle marker 46 on the window 32, the autopilot function management module 22 highlights the flight path angle marker 46 to indicate that the display element is a virtual knob. When the flight path angle marker 46 is selected and moved along the VSI scale (e.g. in a direction along the arrows), the autopilot function management module 22 changes the appearance of the current flight path angle marker 46 to indicate that the mode associated with the current flight path angle marker 46 has been selected and that a particular flight path angle has been selected. For example, the color, intensity, size, shape, symbol, background, or other form of the flight path angle marker 46 changes.

A vertical speed (VS) marker 48 on the window 32 functions as a virtual knob that is manipulable to engage and disengage a vertical speed (VS) mode and to dial a particular vertical speed. The vertical speed mode, when selected, controls the vertical speed of the aircraft 12. For Example, when in the vertical speed mode, a guidance component uses data from performance and navigation components to compute the necessary maneuvers to maintain a selected vertical speed.

With the cursor 36 near the vertical speed marker 48 on the window 32, the autopilot function management module 22 highlights the vertical speed marker 48 to indicate that the display element is a virtual knob. When the vertical speed marker 48 is selected and moved along the vertical speed scale (e.g., in a direction along the arrows) by a user interacting with a user input device 17, the autopilot function management module 22 changes the appearance of the vertical speed marker 48 to indicate that the mode associated with the vertical speed marker 48 has been selected. For example, the color, intensity, size, shape, symbol, background, or other form of the vertical speed marker 48 changes. The selected vertical speed is displayed in a display box 50.

A course symbol 52 on the window 32 functions as a virtual switch that is selectable to engage and disengage an approach (APP) mode. The approach mode, when selected, arms engagement of approach navigation autopilot function. For Example, when in the approach mode the approach navigation function engages and establishes the aircraft on the glide slope (GS) and localizer (LOC) and tracks to follow the approach path down to the runway threshold for precision landing.

With the cursor 36 near the course symbol 52 on the window 32, the autopilot function management module 22 highlights the course symbol 52 to indicate that the display element is a virtual switch. When the course symbol 52 is selected by a user interacting with a user input device 17, the autopilot function management module 22 changes the appearance of the course symbol 52 to indicate that the mode associated with the course symbol 52 has been selected. For example, the color, intensity, size, shape, symbol, background, or other form of the course symbol 52 changes.

A backcourse symbol 54 on the window 32 functions as a virtual switch that is selectable to engage and disengage a backcourse (BAC) approach mode. For Example, the BAC approach mode, when selected, uses a localizer antennae at the opposite end of the runway from the approach direction. For example, when in backcourse approach mode, the backcourse navigation function engages and the reciprocal of the final approach course will be flown; thereby using the backcourse of the localizer beam to capture and track the aircraft down to the runway.

With the cursor 36 near the backcourse symbol 54 on the window 32, the autopilot function management module 22 highlights the backcourse symbol 54 to indicate that the display element is a virtual switch. When the backcourse symbol 54 is selected by a user interacting with a user input device 17, the autopilot function management module 22 changes the appearance of the backcourse symbol 54 to indicate that the mode associated with the backcourse symbol 54 has been selected. For example, the color, intensity, size, shape, symbol, background, or other form of the backcourse symbol 54 changes.

With any of the virtual switches and knobs shown as described, a text display box 56 can be provided that confirms textually the engaged/disengaged or selected/unselected mode or any additional pilot cues for disagreement of the autopilot function management system to accept a pilot desired action.

Figure 3:
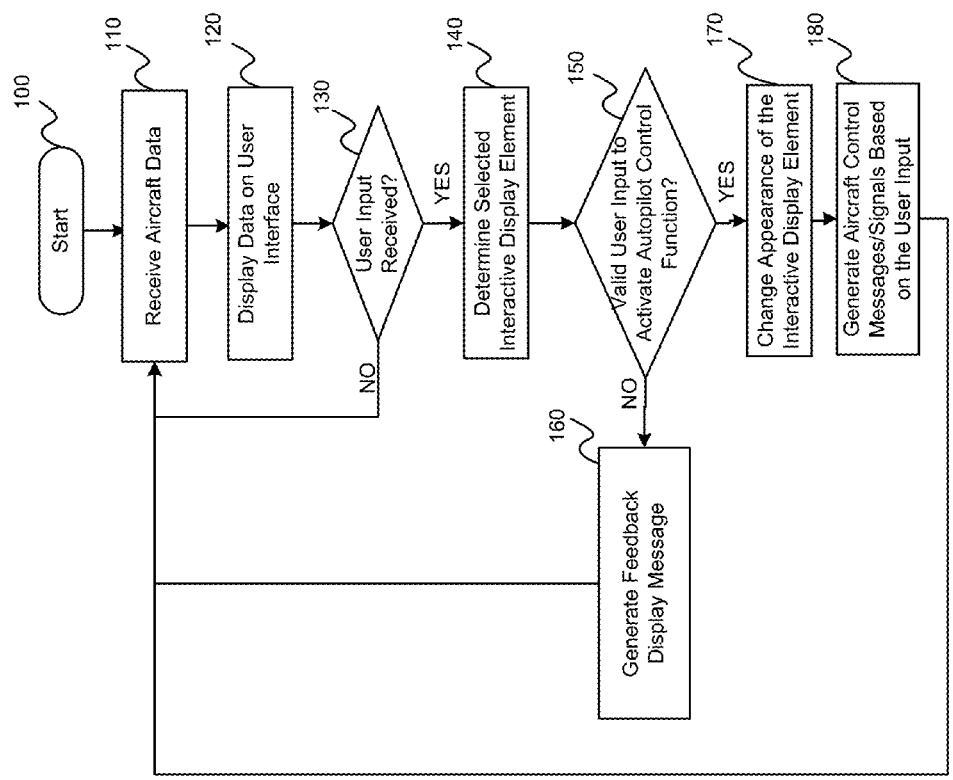
FIG. 3 is a flowchart illustrating an autopilot function management method that may be performed by the autopilot function management system in accordance with exemplary embodiments.

Referring now to FIG. 3, and with continued reference to FIGS. 1 and 2, a flowchart illustrates a method that can be performed by the autopilot function management module 22 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events or may be scheduled to run at predetermined time intervals. In one example, the method may begin at 100. Data is received from various aircraft control and information systems at 110 and displayed on the window 32 at 120. It is determined whether user input is received at 130. If user input is not received at 130, the method continues with receiving the data at 110.

If, however, user input is received at 130, the user input is evaluated to determine which interactive display element 26 the user input pertains to at 140. The user input is then validated at 150. If the user input is not valid (e.g., an invalid selected option, for example, based on current aircraft conditions) at 150, then feedback is generated and displayed on the window 32 at 160 and the method continues with monitoring the aircraft data at 110.

If, however, the user input is valid at 150, the appearance of the interactive display element 26 is selectively changed based on the user input at 170. The user input is further evaluated to generate one or more aircraft control messages and/or signals to control one or more autopilot features of the aircraft 12; and the control of the autopilot features is then synchronized to all redundant systems at 180. Thereafter, the method continues with receiving data from the various aircraft control and information systems at 110 and updating the interface with aircraft information at 120. The method may continue to loop while the interface and/or the aircraft 12 are operational.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first", "second", "third", etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of displaying information on a display device of an aircraft, comprising:
   receiving aircraft data from one or more aircraft components;
   displaying on a user interface the aircraft data and at least one interactive display element associated with autopilot control functions;
   receiving user input based on an interaction with the interactive display element;
   validating the user input based on a set of current aircraft conditions from data received from the aircraft components wherein the components comprise aircraft control systems and information systems; and
   selectively changing an appearance of the interactive display element only upon a validation of the user input based on the data which has been received of the aircraft control systems and information systems, and in association therewith, further evaluating the user input to generate one or more aircraft control messages and/or signals to control one or more of the autopilot control functions of the aircraft wherein the control of the autopilot control functions is thereafter synced to all redundant aircraft control systems.

2. The method of claim 1, wherein the interactive display element is a virtual switch.

3. The method of claim 1, wherein the interactive display element is a virtual knob.

4. The method of claim 1, wherein the interactive display element is at least one of an aircraft symbol, a current aircraft heading marker, a heading dial indicator, a display window, vertical deviation marker, a flight path angle marker, a course reference window, and a backcourse symbol.

5. The method of claim 1, wherein the user interface includes at least one of a horizontal situation display and a vertical situation display.

6. The method of claim 5, wherein the interactive display element is integrated within at least one of the horizontal situation display and the vertical situation display.

7. The method of claim 1, wherein the selectively changing the appearance comprises changing at least one of a color, an intensity, a size, a shape, a symbol, and a background.

8. A system for displaying information on a display device of an aircraft, comprising:
 a display device; and
 a computer module that receives aircraft data from one or more aircraft components, that displays on the display device a user interface, the user interface comprising the aircraft data and at least one interactive display element associated with autopilot control functions, that receives user input based on an interaction with the interactive display element, that validates the user input based on a set of current aircraft conditions from data received from the aircraft components wherein the components comprise aircraft control systems and information systems, that selectively changes an appearance of the interactive display element only upon a validation of the user input based on the data that has been received of the aircraft control systems and information systems, and that in association therewith further evaluates the user input to generate one or more aircraft control messages and/or signals to control one or more of the autopilot control functions of the aircraft wherein the control of the autopilot control functions is thereafter synced to all redundant aircraft control systems.

9. The system of claim 8, wherein the interactive display element is a virtual switch.

10. The system of claim 8, wherein the interactive display element is a virtual knob.

11. The system of claim 8, wherein the interactive display element is at least one of an aircraft symbol, a current aircraft heading marker, a heading dial indicator, a display window, vertical deviation marker, a flight path angle marker, a course indicator, a backcourse symbol.

12. The system of claim 8, wherein the interactive display element is integrated within a display having at least one of lateral and vertical autopilot features.

13. The system of claim 12, wherein the user interface includes at least one of a horizontal situation display and a vertical situation display.

14. The system of claim 12, wherein the interactive display element is integrated within at least one of the horizontal situation display and the vertical situation display.

15. The system of claim 8, wherein the computer module selectively changes at least one of a color, an intensity, a size, a shape, a symbol, and a background.

\* \* \* \* \*